A. J. COTTLE.
REPAIR AXLE.
APPLICATION FILED MAY 1, 1916.
1,257,942.
Patented Feb. 26, 1918.
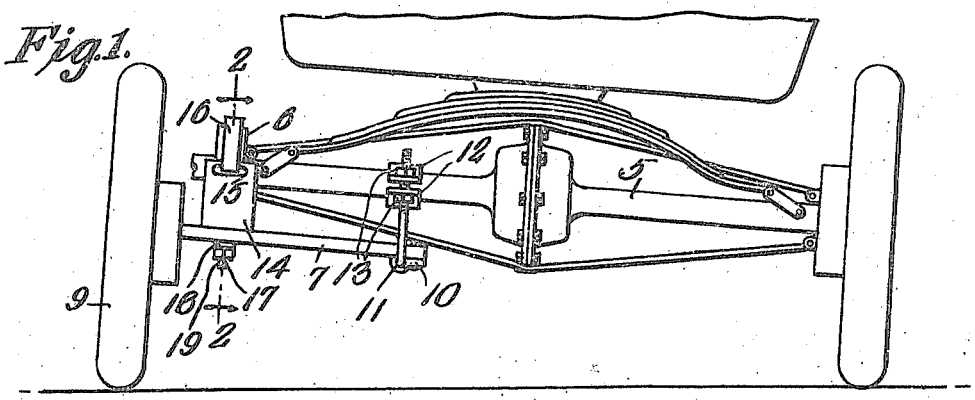
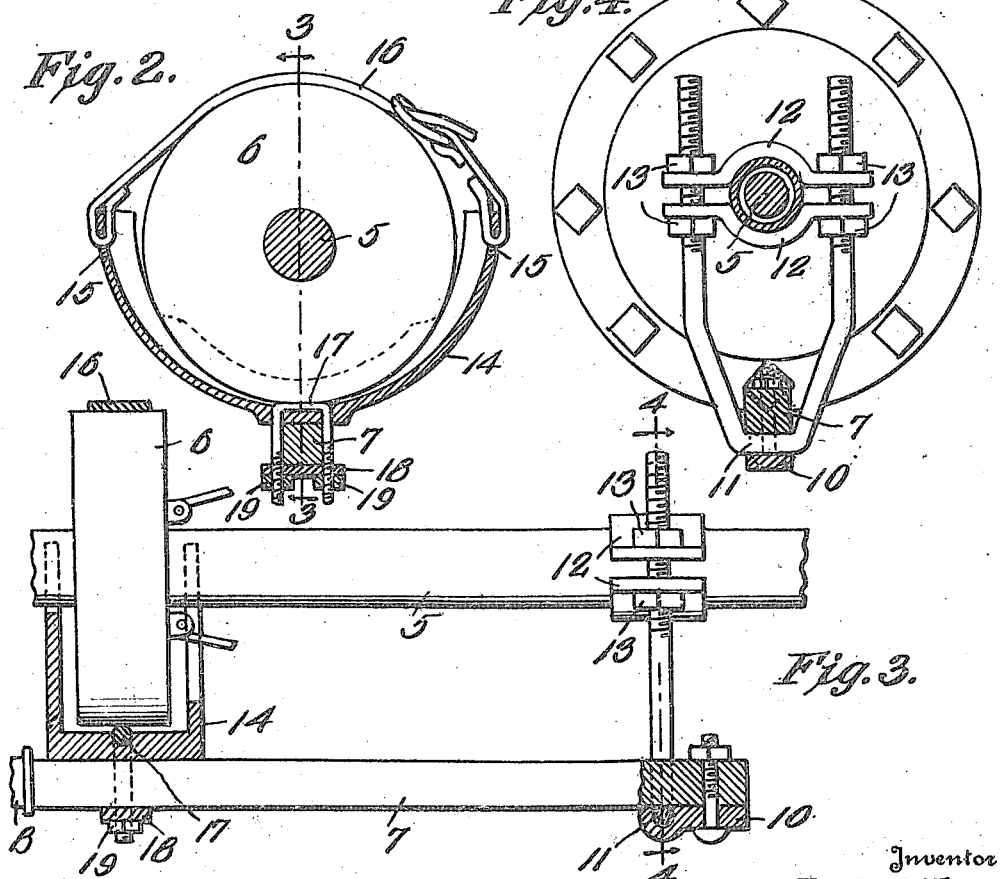
Witnesses
James F. Crown
D. L. Gelt.
Inventor
A. J. Cottle,
By
Attorneys

UNITED STATES PATENT OFFICE.

ALONZO J. COTTLE, OF HARTSVILLE, INDIANA.

REPAIR-AXLE.

1,257,942.

Specification of Letters Patent.  Patented Feb. 26, 1918.

Application filed May 1, 1916. Serial No. 94,793.

*To all whom it may concern:*

Be it known that I, ALONZO J. COTTLE, a citizen of the United States, residing at Hartsville, in the county of Bartholomew, State of Indiana, have invented certain new and useful Improvements in Repair-Axles; and I do hereby declare the following to be a full, clear, and exact description of the invention, such as will enable others skilled in the art to which it appertains to make and use the same.

This invention relates to repair axles for vehicles, and is adapted particularly for use upon motor vehicles.

The primary object of the invention is to provide means whereby a broken vehicle axle may be readily and quickly repaired in such manner as to permit of the vehicle being operated to travel to a suitable repair place A further object of the invention is to provide a supplementary axle adapted for application to broken vehicle axles to afford a temporary repair of the vehicle axle, and which is so constructed and arranged as to be applicable to motor vehicle axles of various shapes, constructions and sizes.

A still further and particular object of the invention is to provide a repair axle which is of simple and inexpensive construction, which is composed of but few readily assembled parts, which possesses the necessary strength or rigidity to support the vehicle and yet which is of light weight, which may be readily attached to and detached from the vehicle axle, and which will prove thoroughly efficient in the attainment of the ends for which it is designed.

With these objects in view and others which will appear as the description proceeds, the invention resides in the novel combination and arrangement of parts, all as will be described more fully hereinafter, illustrated in the drawings, and particularly pointed out in the claim.

The invention will be best understood by reference to the accompanying drawings, wherein:

Figure 1 is a rear elevation of conventional form of motor vehicle and illustrating the application of a repair axle embodying my invention, Fig. 2 is a sectional view taken on line 2—2 of Fig. 1, Fig. 3 is a longitudinal sectional view taken upon line 3—3 of Fig. 2, and Fig. 4 is a transverse sectional view taken one line 4—4 of Fig. 3.

Referring now more particularly to the drawing, 5 indicates generally the rear axle of a conventional form of motor vehicle, the same being equipped with the usual brake drum casing 6 as shown. As is shown in the drawing, the vehicle axle is broken, and to support the wheel upon the remaining axle length to enable the vehicle to be conveniently driven to a repair shop, a supplementary or repair axle 7 is connected thereto. This supplementary axle is formed of a substantially short strong bar, one end of the same being turned to form a spindle 8, upon which the vehicle wheel 9 may be rotatably mounted. The innermost extremity of the stub axle 7 is provided with a clevis 10, through which the bight portion 11 of a U-bolt is inserted, the arms of said U-bolt projecting upwardly, one upon each side of the vehicle axle to support the sectional clamping sleeve 12 engaged firmly around the vehicle axle. Nuts 13 are arranged upon the arms of the U-bolt to engage and force the upper and lower sections of the clamping sleeve firmly upon the vehicle axle.

To enable the stub or supplementary axle to be rigidly adjusted to the main vehicle axle and to accommodate the usual brake band casing, a shell 14 is provided. This shell is of substantially semi-circular formation in cross-section, being of a width sufficient to enable the same to be engaged over the periphery of the brake drum. The end faces of the shell are cut away as shown to permit of the vehicle axle projecting therethrough, and so as not to interfere with the various struts which extend from the inner face of the brake drum. The ends of the shell are apertured as at 15 to permit of the application of straps or ropes 16 thereto to bind the shell to the axle, springs, or drum. This shell may be secured to the stub or supplementary axle by means of the U-bolt 17, the latter having its arms extending downwardly one upon each side of the stub axle, being connected at their extremities by the bar 18, the latter being securely clamped upon the end face of the stub axle by nuts 19. The U-bolt has its arms projecting through suitably spaced apertures formed in the lower portion of the shell, the construction permitting of the shell being readily detached from the stub axle when desired. It is also to be observed that this particular construction permits of the shell being adjusted longitudinally of the stub axle to conform to vehicle axles or brake drums of various constructions. With a device of this character, it is apparent that should the vehicle axle become broken, the same may be quickly and easily repaired to enable the vehicle to proceed to its destination. By tightening or loosening the nuts 13 upon the clevis bolt, it is apparent that the angularity of the stub shaft with relation to the vehicle shaft may be varied. By reason of the features of adjustment of the device, it is apparent that the same may be with facility applied to vehicle axles of varied designs and shapes. The compactness of the device permits of the same being readily stored in the tool box or other storage place upon the vehicle.

While the above is a description of the preferred embodiment of the invention, it is to be understood that I am not necessarily restricted to such arrangement and combination of parts, as it is apparent that various changes in the minor details of construction may be resorted to without departing from the spirit of the invention or exceeding the scope of the claim.

What is claimed is:

The combination with a vehicle axle, of a supplementary axle for supporting the vehicle axle, a housing on the supplementary axle to receive the brake hub of the vehicle axle, said housing including side-walls recessed to seat the axle portion in either side of the hub, a strap across the housing to secure the hub therein against vertical movement, a U-shaped clevis pivotally clamped on the inner end of the supplementary axle to swing longitudinally of the latter, and an adjustable clamp on the free ends of the arms of said clevis to be secured around the vehicle axle, said clevis providing a lateral relative play of the supplementary axle.

In testimony whereof, I affix my signature, in the presence of two witnesses.

ALONZO J. COTTLE.

Witnesses:
 Ivy B. Russell,
 F. Williams.

Copies of this patent may be obtained for five cents each, by addressing the "Commissioner of Patents, Washington, D. C."